United States Patent [19]

Eckel et al.

[11] 4,288,353
[45] Sep. 8, 1981

[54] CARBON BEARING CONTACT PASTE

[75] Inventors: Wolf-Dietrich Eckel, Frankfurt; Eckhard Schulz, Bad Homburg, both of Fed. Rep. of Germany

[73] Assignees: Swiss Aluminium Ltd., Chippis, Switzerland; Sigri Elektrographit GmbH, Meitingen, Fed. Rep. of Germany

[21] Appl. No.: 194,965

[22] Filed: Oct. 8, 1980

[30] Foreign Application Priority Data

Oct. 20, 1979 [DE] Fed. Rep. of Germany ....... 2942469

[51] Int. Cl.$^3$ ............................ C08L 95/00; C09J 3/30
[52] U.S. Cl. ................................... 260/28 R; 156/330; 156/337; 156/DIG. 68; 156/DIG. 74; 156/DIG. 61; 156/DIG. 76; 428/408; 428/489; 428/688
[58] Field of Search ....................................... 260/28 R

[56] References Cited

U.S. PATENT DOCUMENTS

| 3,105,771 | 10/1963 | Simpson et al. | 260/28 R |
|---|---|---|---|
| 3,903,025 | 9/1975 | Farrington et al. | 260/28 R |
| 3,994,735 | 11/1976 | Ishihara et al. | 260/28 R |
| 4,001,104 | 1/1977 | Vadla et al. | 204/243 R |
| 4,162,998 | 7/1979 | Doi et al. | 260/28 R |

FOREIGN PATENT DOCUMENTS

| 1236392 | 3/1967 | Fed. Rep. of Germany . |
|---|---|---|
| 1558744 | 4/1972 | Fed. Rep. of Germany . |
| 883676 | 12/1961 | United Kingdom . |

*Primary Examiner*—H. S. Cockeram
*Attorney, Agent, or Firm*—Bachman and LaPointe

[57] ABSTRACT

Carbonaceous contact paste for producing a high strength, electrically conductive connection between elements which experience high temperatures. The cold workable paste comprises a mixture of epoxy resin and tar as binder and graphite and metal in powder form as solid constituents. Before being used, an acid-free hardener e.g. polyamine is added to the paste.

The electrical and thermal conductivity of the contact paste correspond to that of carbon blocks, and the paste is particularly suitable for joining such blocks to metallic conductors e.g. as in anodes and cathodes for cells used for the fused salt electrolytic production of aluminum.

10 Claims, No Drawings

CARBON BEARING CONTACT PASTE

BACKGROUND OF THE INVENTION

The invention relates to a cold workable contact paste which contains carbonizable binding agents and a powdery solid component.

The use of carbon and graphite items e.g. in metallurgical furnace linings or the electrodes in cells for the electrolytic production of aluminum often leads to the problem of joining individual components or parts to make a unit which can also withstand elevated temperatures, and this such that the joints exhibit good thermal and electrical conductivity. Up to now it has only been possible to solve this problem satisfactorily in special cases. As carbon and graphite can, in general, not be welded, the joints are made using a contact paste which contains carbonizable binding agents and which, after being introduced into a suitably sized gap between the bodies to be joined, is transformed to carbon by heating and acts then as a binder. To be able to introduce the paste into the gaps, the paste must possess sufficient plasticity i.e. the mass, containing a coal tar pitch as a binder or petroleum pitch, must be heated to a temperature of about 100° C. above its softening point before it is introduced into the gaps. Special devices are needed for this e.g. mixers which can be heated and which are fitted with facilities for measuring and controlling the temperature of the paste. Without these relatively expensive measures it is almost impossible to prevent damage occuring to the paste due to local overheating or the like. The viscosity of the contact paste increases with decreasing temperature. This means that relatively high working temperatures are necessary, at which even larger amounts of tars and other substances are emitted which could be harmful to the human body.

In practice it is not always possible to achieve the necessary requirements with the result that the quality of the joint may not match up to expectations. Contact pastes containing a pitch binder exhibit another property which limits their application. Only after reaching a temperature above ~500° C.—after coking has been completed—does the junction between the parts to be joined become mechanically strong and exhibits relatively good electrical and thermal conductivities. Cold workable contact pastes do not exhibit the above disadvantages and therefore numerous pastes of widely differing composition have been proposed with this in mind. Cold workable contact pastes generally contain resins which harden on heating or a special catalyst which accelerates the process of hardening or curing a resin at room tempeature. By adding solvents or diluting agents the plasticity of these pastes can be adjusted to a certain extent to suit the application. On the other hand contact pastes containing resins have only limited storage times if they are not stored at low temperatures, e.g. in cold rooms.

All contact pastes contain, besides the binding agent, a so-called solid component which minimizes the shrinkage of the binder during the coking process and is intended to improve the thermal and electrical conductivity of the green mass and of the coked contact paste. Preferred solid components are types of carbon and graphite, the chemical and thermal properties of which correspond to those of the carbon and graphite bodies to be joined e.g. anthracite, cokes, carbon black and graphite. Also suitable are refractory ceramic materials such as dolomite, corundum, periclase and the like. In general, under the term solids is understood materials which basically do not change when used in the contact paste. The amounts and particle size of the solids used depend among other things on the width of the gap at the joint, whereby in general the amount and particle size increase with increasing size of gap. Appropriate use of the contact pastes allows a strength of joint to be achieved which is in general adequate for the particular application. On the other hand the thermal and electrical conductivity of the joint is in many cases inadequate. To overcome this inadequacy a number of suggestions have been made including the proposal to add metal powders or turnings to the paste inasmuch as the temperature reached in the application in question would allow. Examples of this are presented in patents DE-AS No. 1,236,392, GB-PS No. 883,676 and US-PS No. 4,001,104.

A significant disadvantage in connection with the known contact pastes is that the properties which can be achieved are substantially determined by the conditions of manufacture including the rate of heating to temperature and the time at temperature, whereby the parameters related to the heating are given by the particular application. In general, therefore, for different applications use is also made of different pastes which are prepared with particular heating conditions in mind. For example the German Pat. No. 1 558 744 describes a contact paste for joining a metallic conductor and a carbon anode for an aluminum reduction cell, where the paste contains furfurylalcohol resin and graphite particles impregnated with an acidic catalyst. A contact paste for joining a metallic conductor and carbon cathode for the same electrolytic process is made up, according to the British Pat. No. 883, 676, of a mixture containing graphite intercalation compound graphite or metal powder and phenolic and furan resins. A contact paste for creating a connection between the individual carbon cathodes for the same process comprises, according to the German Pat. No. 25 09 550, essentially a mixture of anthracite, pitch and methyl naphthalene. There are therefore three different advantageous contact pastes for functionally related parts of a reduction cell.

A number of different contact pastes is also used for the linings of furnaces e.g. for blast furnaces used to produce iron, for tap hole plugs and the like. It is therefore an object of the present invention to develop a contact paste which has a wider range of application, is much less sensitive to scatter and changes in the processing conditions than the known pastes and can be produced at lower expense. A second object of the invention is that the paste exhibits a high degree of plasticity at room temperature and, even before the carbonizing of the binding agents, exhibits high thermal and electrical conductivity.

SUMMARY OF THE INVENTION

These objects are achieved by way of the invention in that the contact paste contains a mixture of epoxy resin and tar as binding agent, a mixture of graphite and metal powder as solid component, and an acid-free hardening agent.

According to a preferred version of the invention the contact paste comprises 15–20 wt.% binder, 1–5 wt.% hardener and 65–85 wt.% solids. The binder in particular comprises 5–15 wt.% epoxy resin and 8–20 wt.% tar pitch, the radio by weight of metal/graphite powders in the solids mixture being usefully 1:1 to 3:1.

DETAILED DESCRIPTION

Particularly suitable epoxy resins are the types with a solidus point <5° C., which are liquid at the temperatures prevailing during the production of the contact paste. The molecular weight of these types of resins is about 250–350. The hardeners, which depend on the application, are acid-free; advantageous here are polyamines e.g. ethylene-diamine, triethylene-tetra-amine or hexa-methylenetetra-amine. After adding the hardener, the resin cross-links at room temperature within about 10–24 hours. If desired, the setting can be accelerated by gently heating the paste.

Under the term "tar" is to be understood mixtures, which are liquid at room temperature, of bituminous-type materials formed by pyrolisis viz., mainly aromatic compounds e,g. coking tars and tars from the low temperature carbonization of bituminous coal and brown coal, or petrol tars originating from petroleum. The tars should contain about 5–15% of constituents which are insoluble in benzene and the residue after coking should usefully amount to at least 20%. At room temperature the viscosity of the tars should be about 1 Ns/m$^2$.

Suitable metals for the metal powder constituent are particularly those which do not react with the carbon in the paste at the processing or using temperatures to form compounds which would impair the properties of the paste. Besides pure metals and low alloyed metals such as, for example, iron, copper or aluminum, additions of alloys such as brass or mixtures of different metals, if desired, are also advantageous. The particle size of the metal should be at most 1 mm. Under the term "particle size" is to be understood equivalent diameter so that metal chips or turnings >1 mm in length, and <1 mm in width and thickness, belong to the advantageous form. Chip- or turning-shaped particles are also advantageous in that, due to the orienting effect during the processing of the contact paste, connections with a particularly low, transverse thermal and electrical resistance can be produced.

For the graphite in the solids part of the paste natural graphite and electrographite are equally suitable. Due to the, in general, larger anisotropy of natural graphite grains or flakes the orientation effect described above for metal chips can be intensified, and connections with a very small transverse resistance can be produced. The particle size of the graphite used in the paste is generally in proportion to the gap to be filled; preferred, however, are graphite powders which have a maximum particle size of <100 μm and exhibit a particularly favorable degree of plasticity and homogeneity. A suitable range of particle sizes is for example:

| | |
|---|---|
| 63–100 μm | 30% |
| 35–63 μm | 40% |
| <35 μm | 30% |

To manufacture the contact paste the solids viz., the graphite and the metal powder, are mixed with the tar constituents of the binder at room temperature, for example in a paddle mixer, whereby ten minutes of mixing is generally adequate. This part of the contact paste can be stored at room temperature for an almost unlimited period of time, and can therefore be made in large quantities and held in reserve. Shortly before the contact paste is to be used the hardening catalyst is stirred into the epoxy resin component of the binder, the homogenous solution added to an aliquot of the solid-tar mixture and the resulting mixture stirred mechanically for about 10 minutes. The contact paste, which has a consistency which allows it to be spread easily, is applied to the bodies to be joined by means of spatulas, trowels, by pressing in with the hand or by spray pistols.

Mixtures of epoxy resins and tar-containing masses have become known as corrosion resistant painting materials and as coatings for concrete and steel surfaces. Such pastes are however applicable only for use at relatively low temperatures, and exhibit a very high thermal and electrical resistance. The paste according to the invention, which features a similar good adhesion to ceramic and metal surfaces and a very small degree of shrinkage on hardening the resin components, is characterized further by thermal stability and the low thermal and electrical resistance over the whole range of application. The favorable mechanical and conductive properties are achieved surprisingly independent of the rate of heating up and other factors related to the heating conditions so that the paste is to a large degree independent of the unavoidable changes which occur in parameters during operations, and is suitable for making a large number of connections which are subject to loading in a wide range of ways. The number of contact or filler pastes needed up to now for various purposes can be correspondingly decreased, and the connections made using the paste according to the invention exhibit a particularly favourable degree of reliability to the operation in question.

In the following a number of examples is presented explaining in particular the use of the contact paste and the properties of the connections made using the contact paste.

EXAMPLE 1

In order to create a mechanically stable, low contact resistance connection between a carbon anode, which is used to produce aluminum by the electrolysis of fused salts, and a pin-shaped metallic conductor, a mixture was prepared, as described in detail above, by mixing 71 parts by weight (p.b.w.) of solids, 14 p.b.w. coal tar, 15 p.b.w. epoxy resin and 3 p.b.w. hardener and uniting both parts of the mixture. The total amount of binder was 29 p.b.w.; the solids comprised aluminum fines and graphite powder in the ratio 1:1. The maximum particle size of the aluminum fines was about 0.3 mm; the graphite powder had the following size distribution;

| | |
|---|---|
| 63–100 μm | 20% |
| 35–63 μm | 45% |
| <35 μm | 35% |

The pin-shaped metal conductor was introduced into a recess in the anode and the approx. 6 mm wide gap between the surface of the pin and the surface of the recess filled with the contact paste. The resin was hardened completely after about 15–18 hours at room temperature. After heating to 600° C., which corresponds approximately to the maximum temperature reached in service, the specific electrical resistance of the partly coked contact paste was approximately 400 μΩm. A paste containing bituminous coal tar which had been produced under the same conditions exhibited a resistance of approximately 500 μΩm. The resistance of the connection made using the paste according to the invention is therefore around 20% lower than the resistance of conventional contact paste, and corresponds to the resistance of a connection made by pouring cast iron into the gap. This last mentioned method is technically very involved and the carbon recovered from the butt of the used anode is contaminated with iron to a greater or less extent.

EXAMPLE 2

Carbon and graphite blocks for the cathodic floor of a cell for electrolytic production of aluminum are provided with groove-shaped recesses to accommodate busbars. It is known practice to fill the residual gap between the metal busbar and the surface of the recess with cast iron—which, as mentioned above, involves a large amount of technical effort. A further disadvantage of such a practice is the shock-like production of stresses which can cause the cracks in the carbon blocks. Instead, therefore, use is made of contact pastes with bituminous binders which however exhibit a relatively high electrical resistance, due in part to the paste coming free of the contact surfaces at higher temperatures.

The contact paste according to the invention used to bed the busbars into the carbon blocks had the following composition:

22 parts binder (10 parts epoxy resin, 12 parts tar)
2 parts hardener
78 parts solids (iron/graphite = 3:1)

Iron or steel particles were produced with a length of up to 3 mm, and width and thickness of about 0.5 mm. The paste was deposited using a spray gun and the joint heated to 900° C. over a period of about 4 hours. The specific electrical resistance of the joint changed as follows:

| Temperature | Spec. electr. resistance |
| --- | --- |
| 20° C. | 50,000 μΩm |
| 300° C. | 2,000 μΩm |
| 600° C. | 200 μΩm |
| 900° C. | 40 μΩm |

At the temperature of use, which was about 900° C., the resistance of the coked contact paste become practically the same as that of the adjacent carbon blocks.

EXAMPLE 3

A contact paste of the following composition was employed to fill the gaps between carbon block layers and the outer lining of a blast furnace:

17 parts binder (7 parts epoxy resin, 10 parts coking tar)
1.5 parts hardener
83 parts solids (iron/graphite = 2:1)

Graphite powder:

| | |
| --- | --- |
| 63–100 μm | 40% |
| 35–63 μm | 45% |
| <35 μm | 15% |

The iron was prepared in the form of chips, the hardener used was hexa-methylene-tetra-amine. The purpose of the contact paste is to lower the thermal resistance between the inner and the cooled outer linings, and a corresponding increase in thermal conductivity. The temperature in the joint, which depends on the type of block used and the intensity of the cooling, was 100–300° C. In this temperature range the thermal conductivity of the paste is 6 W/m °K and corresponds therefore to the thermal conductivity of the adjacent carbon blocks. A thermal conductivity of the same order of magnitude can in fact be achieved using known pastes; however, these pastes exhibit only limited mechanical stability. These pastes are frequently observed to crumble, which makes repair work difficult. The paste according to the invention on the other hand forms a stable monolithic body. What is claimed is:

1. Contact paste, which can be cold worked and contains carbonizable binding agents and powdered solids, which comprises as binder a mixture of epoxy resin and tar, as solids a mixture of grahite and metal powders, and an acid-free hardener.

2. Contact paste according to claim 1 comprising 15–30 parts by weight of binder, 65–85 parts by weight of solids and 1–5 parts by weight of hardener.

3. Contact paste according to claim 1 wherein the binder mixture contains 5–15 parts by weight epoxy resin and 8–20 parts by weight tar.

4. Contact paste according to claim 2 wherein the weight ratio metal power/grphite powder in the mixture of solids amounts to 1:1 to 3:1.

5. Contact paste according to claim 2 wherein the melting point of the epoxy resin is lower than 50° C.

6. Contact paste according to claim 2 wherein the particle size of the metal powder is less than 1000 μm and that of the graphite powder is less than 100 μm.

7. Contact paste according to claim 5 wherein the epoxy resin has a molecular weight of from 250–350 and is liquid at ambient temperatures.

8. Contact paste according to claim 2 wherein the hardener is a polyamine.

9. Contact paste according to claim 2 wherein the tar is liquid in room temperature and is insoluble in benzene.

10. Contact paste according to claim 2 wherein said metal powder is selected from the group consisting of iron, aluminum, copper, and alloys thereof.

* * * * *

UNITED STATES PATENT AND TRADEMARK OFFICE
CERTIFICATE OF CORRECTION

PATENT NO. : 4,288,353

DATED : September 8, 1981

INVENTOR(S) : Wolf-Dietrich Eckel and Eckhard Schulz

It is certified that error appears in the above-identified patent and that said Letters Patent are hereby corrected as shown below:

In Column 2, line 65, change "15-20" to --15-30--.

In Column 2, line 68, change "radio" to --ratio--.

In Column 3, line 17, change "e,g." to --e.g.--.

In Column 3, line 68, change "homogenous" to --homogeneous--.

In Column 4, line 13, change "similar" to --similarly--.

In Column 4, line 49, after "distribution" change ";" to --:--.

In Column 5, line 7, change "less" to --lesser--.

In Column 5, line 13, after "is" insert --a--.

In Column 5, line 15, after "iron" delete "-" and insert --,--.

In Column 5, line 45, change "become" to --became--.

In Column 6, line 28, claim 1, change "grahite" to --graphite--.

In Column 6, line 33, claim 3, change the dependency from "claim 1" to --claim 2--.

In Column 6, line 37, claim 4, change "grphite" to --graphite--.

In Column 6, line 40, claim 5, change "50°C" to --5°C--.

Signed and Sealed this

Twenty-second Day of December 1981

|SEAL|

Attest:

GERALD J. MOSSINGHOFF

Attesting Officer   Commissioner of Patents and Trademarks